United States Patent
Kawai et al.

(10) Patent No.: US 7,493,761 B2
(45) Date of Patent: Feb. 24, 2009

(54) HYDRAULIC PRESSURE FEEDER AND MOTORCYCLE PROVIDED WITH THE HYDRAULIC PRESSURE FEEDER

(75) Inventors: Hideo Kawai, Shizuoka (JP); Manabu Abe, Shizuoka (JP); Itsurou Migita, Shizuoka (JP); Kazuaki Ura, Shizuoka (JP); Masatoshi Kurita, Shizuoka (JP); Fujio Ikki, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 154 days.

(21) Appl. No.: 11/468,643

(22) Filed: Aug. 30, 2006

(65) Prior Publication Data
US 2007/0051104 A1    Mar. 8, 2007

(30) Foreign Application Priority Data
Sep. 6, 2005    (JP)    ............... 2005-258321

(51) Int. Cl.
*B60T 7/02*    (2006.01)
*F15B 7/08*    (2006.01)

(52) U.S. Cl. .......................... 60/594; 60/585
(58) Field of Classification Search .................. 60/585, 60/594; 188/344
See application file for complete search history.

(56) References Cited

U.S. PATENT DOCUMENTS

| | | | | |
|---|---|---|---|---|
| 3,233,411 | A | * | 2/1966 | Schubert ...................... 60/585 |
| 6,336,327 | B1 | * | 1/2002 | Noro et al. ................... 60/594 |
| 6,883,647 | B1 | * | 4/2005 | Wen ........................... 188/344 |
| 6,892,837 | B2 | * | 5/2005 | Simmons et al. ........... 180/6.44 |
| 2004/0045775 | A1 | * | 3/2004 | Lavezzi ................... 188/24.11 |
| 2005/0056110 | A1 | * | 3/2005 | Laghi et al. ................... 74/489 |

FOREIGN PATENT DOCUMENTS

JP    10-250666    9/1998

* cited by examiner

*Primary Examiner*—Michael Leslie
(74) *Attorney, Agent, or Firm*—Hogan & Hartson LLP

(57) ABSTRACT

A hydraulic pressure feeder suppresses wavy motions and bubbles in working oil in a reservoir tank. A hydraulic braking device includes a master cylinder mounted to a handle bar to accommodate therein a piston mechanism. A reservoir tank replenishes the piston mechanism with working oil. A brake lever is mounted to the master cylinder to drive the piston mechanism. The master cylinder is arranged forwardly of the handle bar and the reservoir tank is provided on the master cylinder to cover an upper portion of the master cylinder.

10 Claims, 10 Drawing Sheets

[Fig. 1]
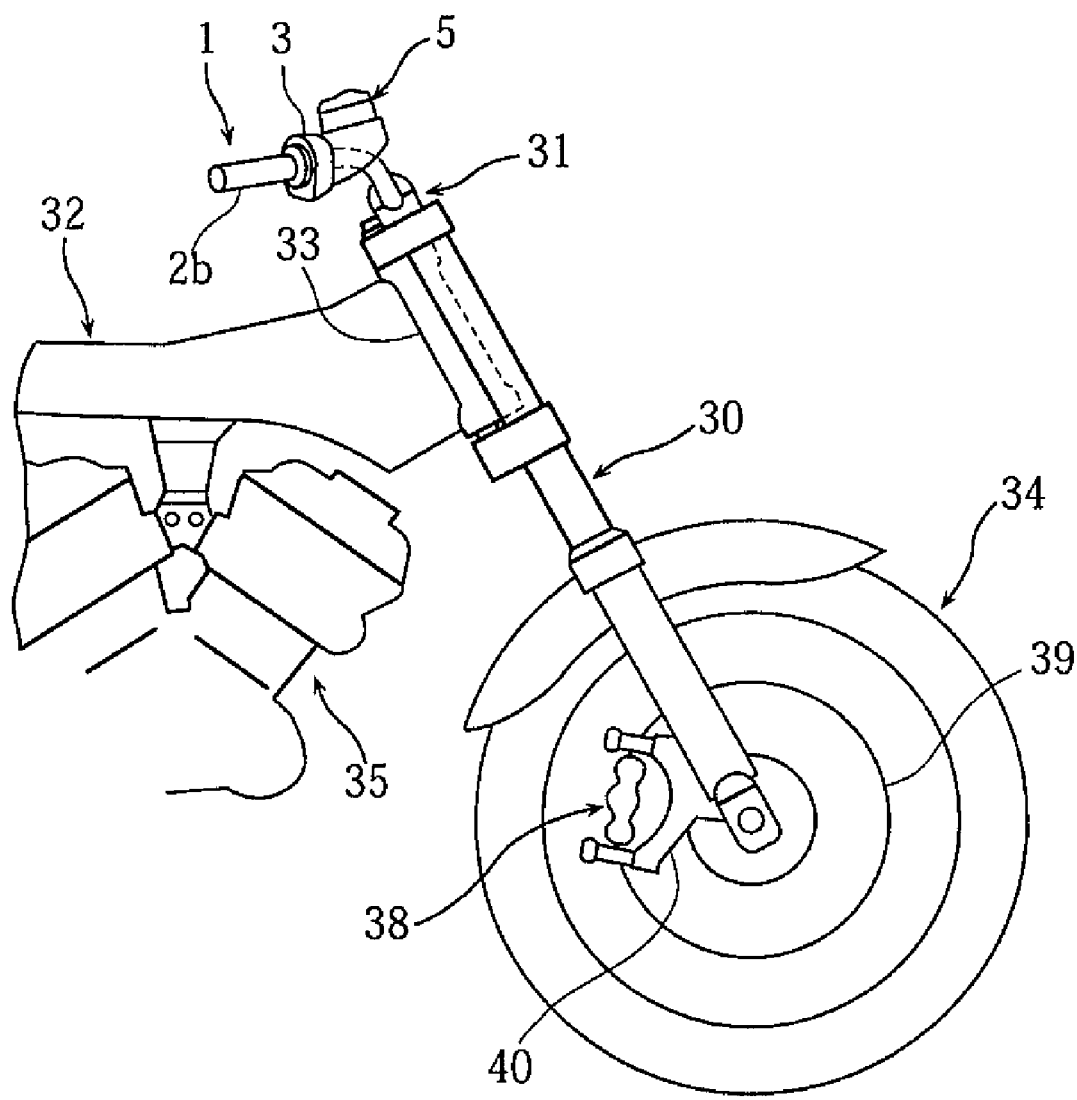

[Fig. 2]
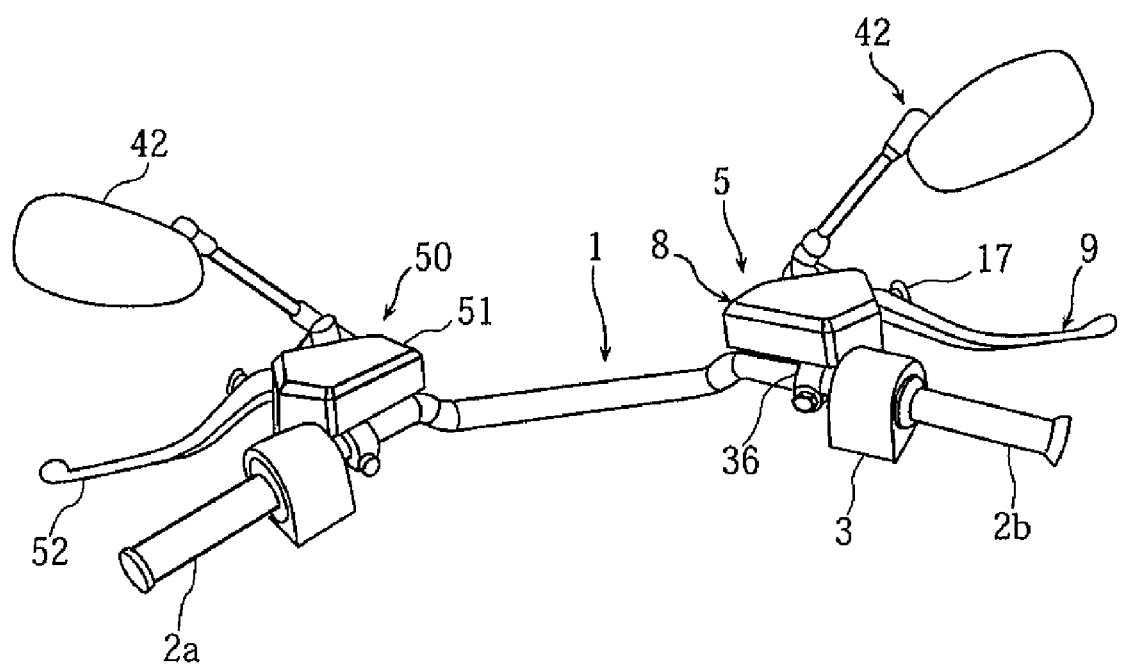

[Fig. 3]
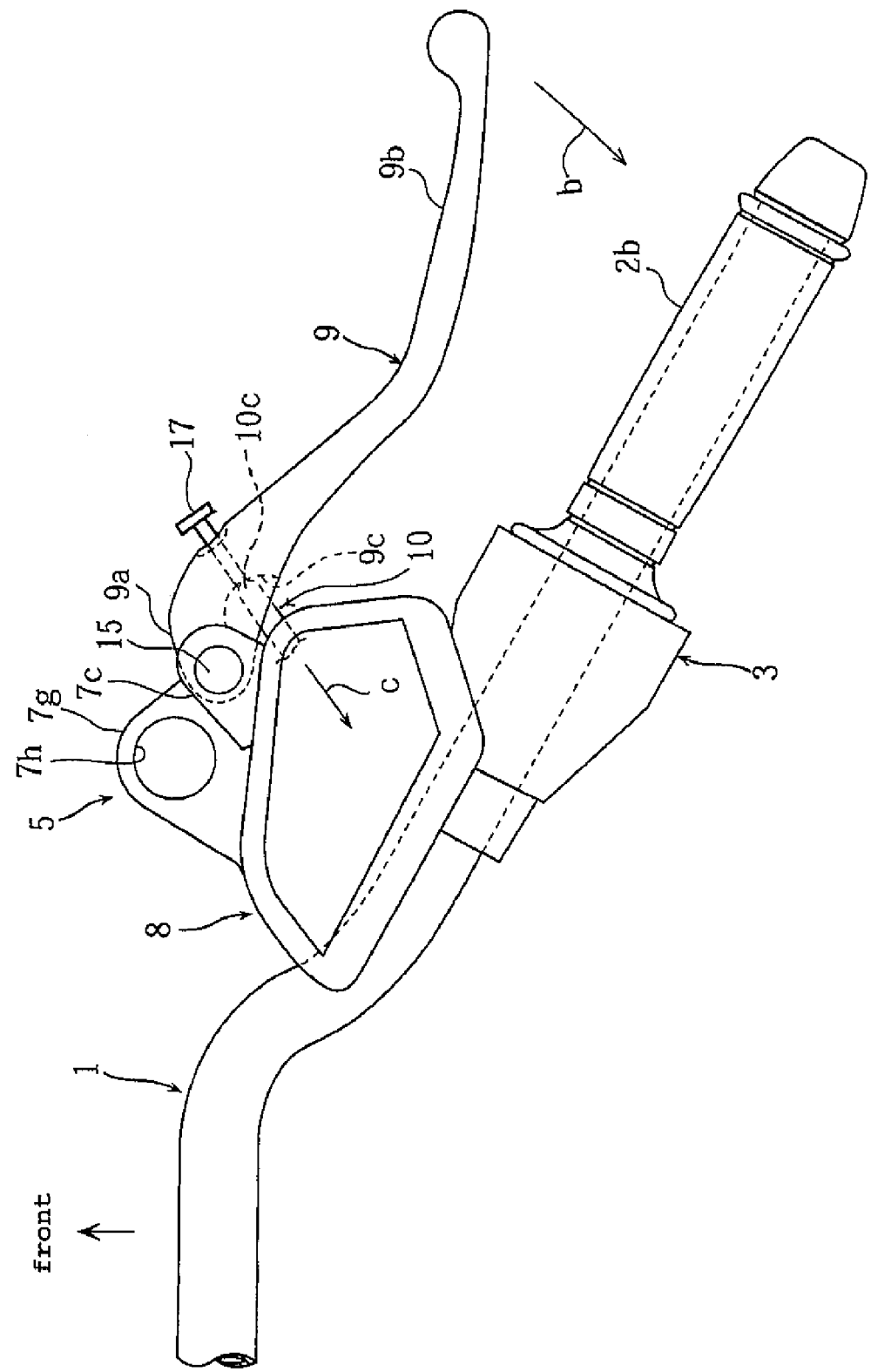

[Fig. 4]
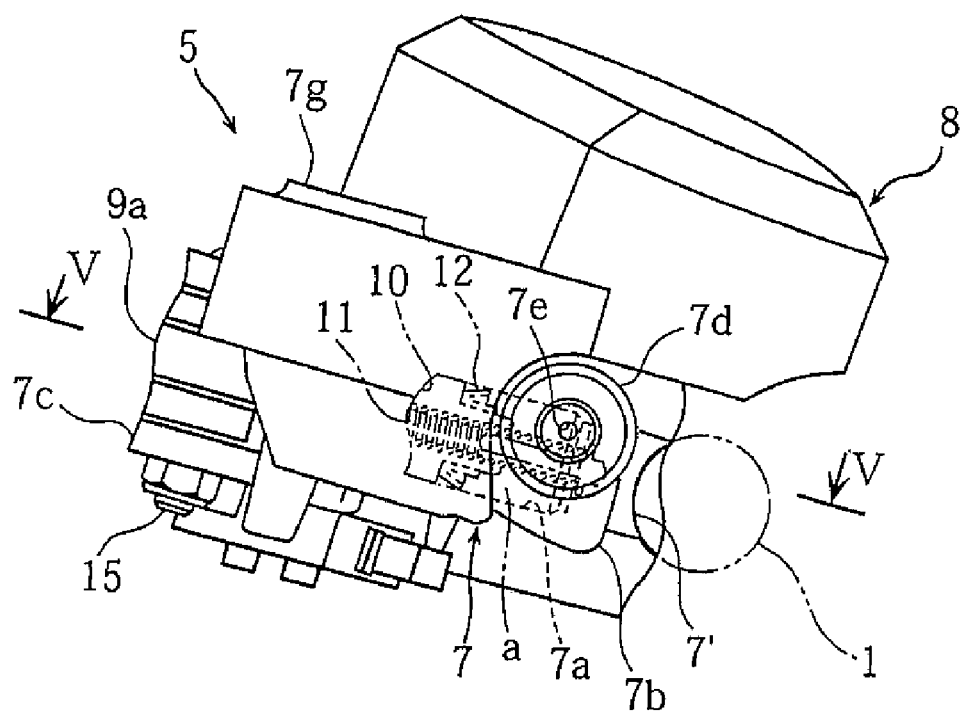

[Fig. 5]
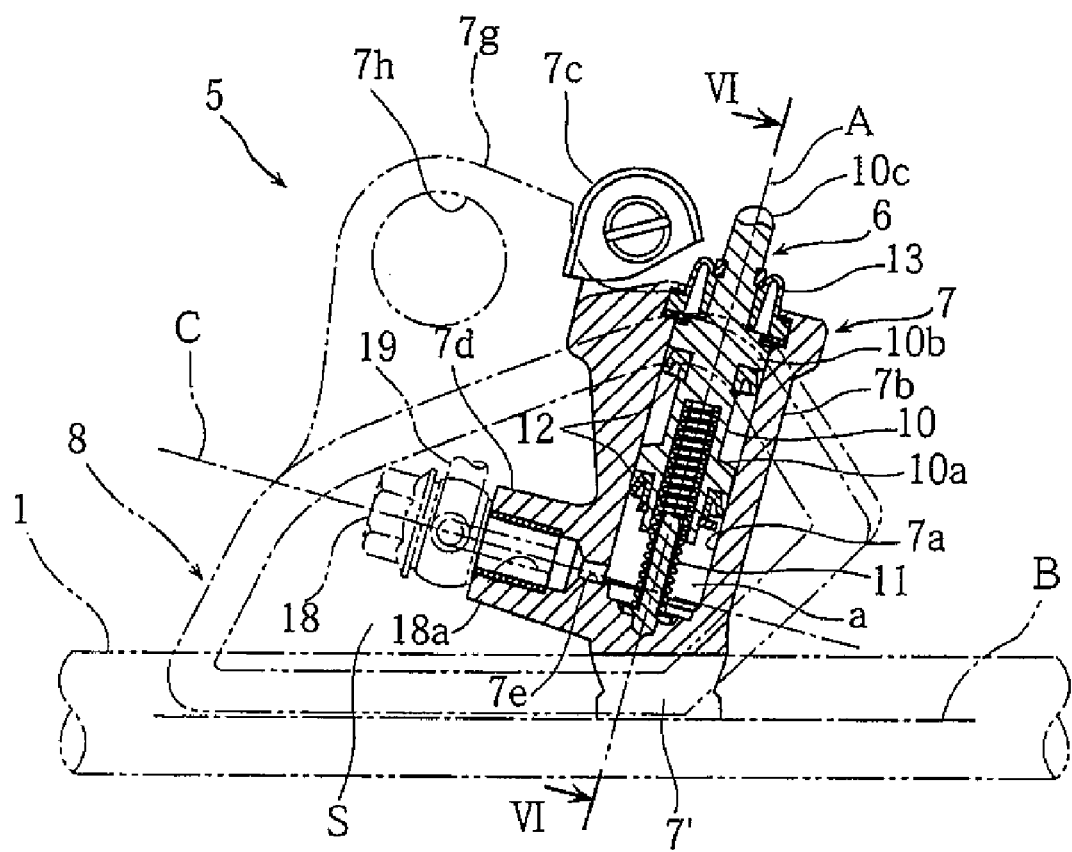

[Fig. 6]
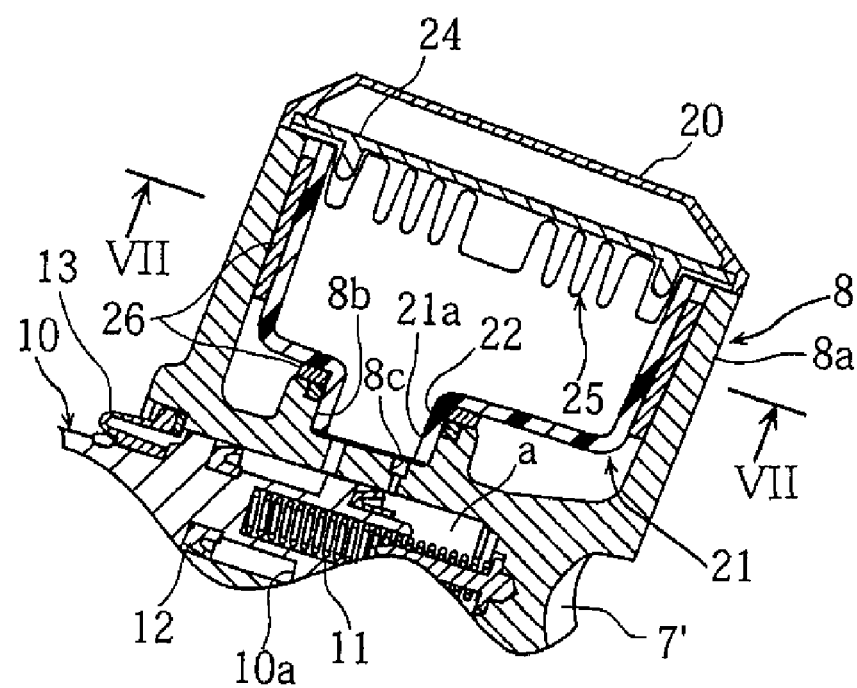

[Fig. 7]
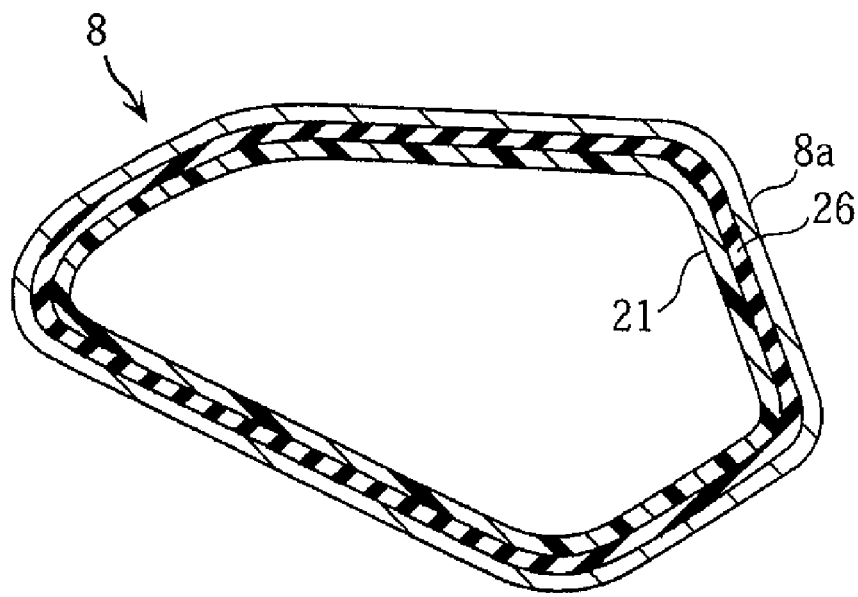

[Fig. 8]
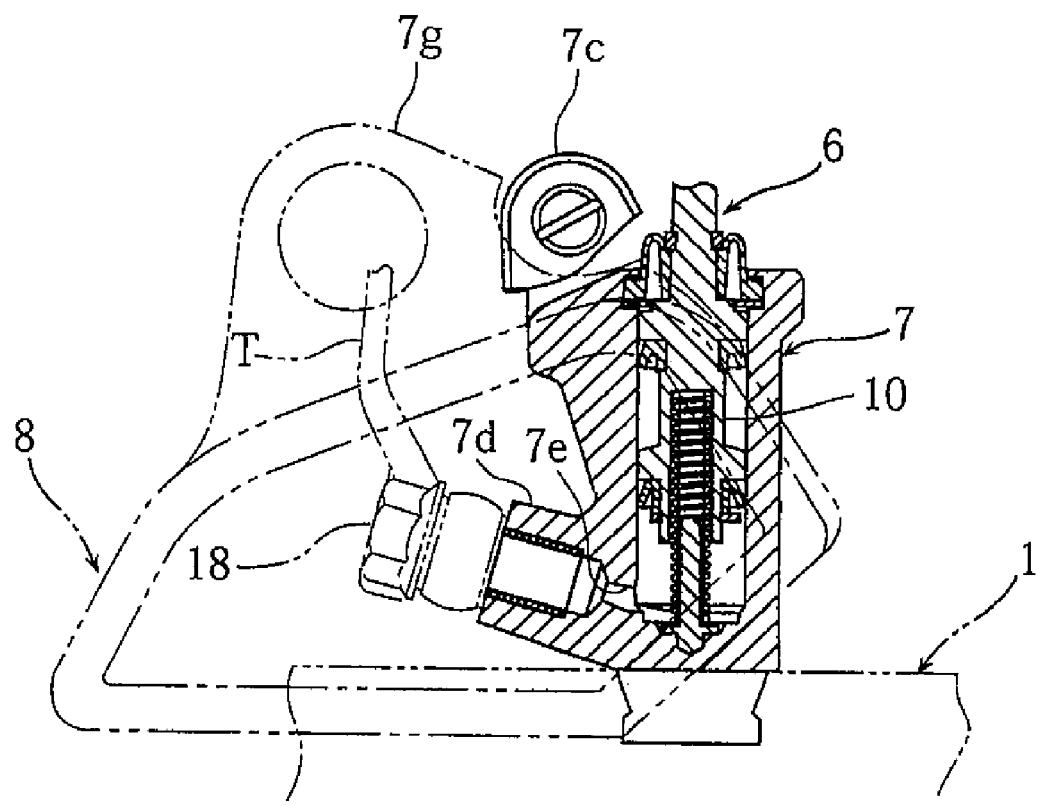

[Fig. 9]
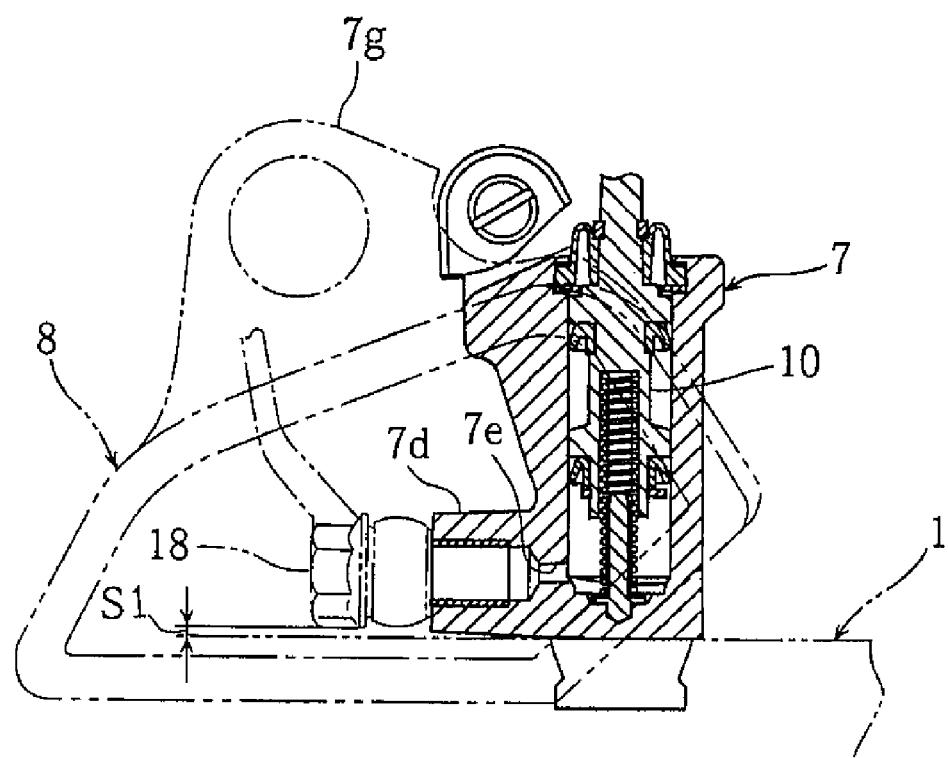

[Fig. 10]
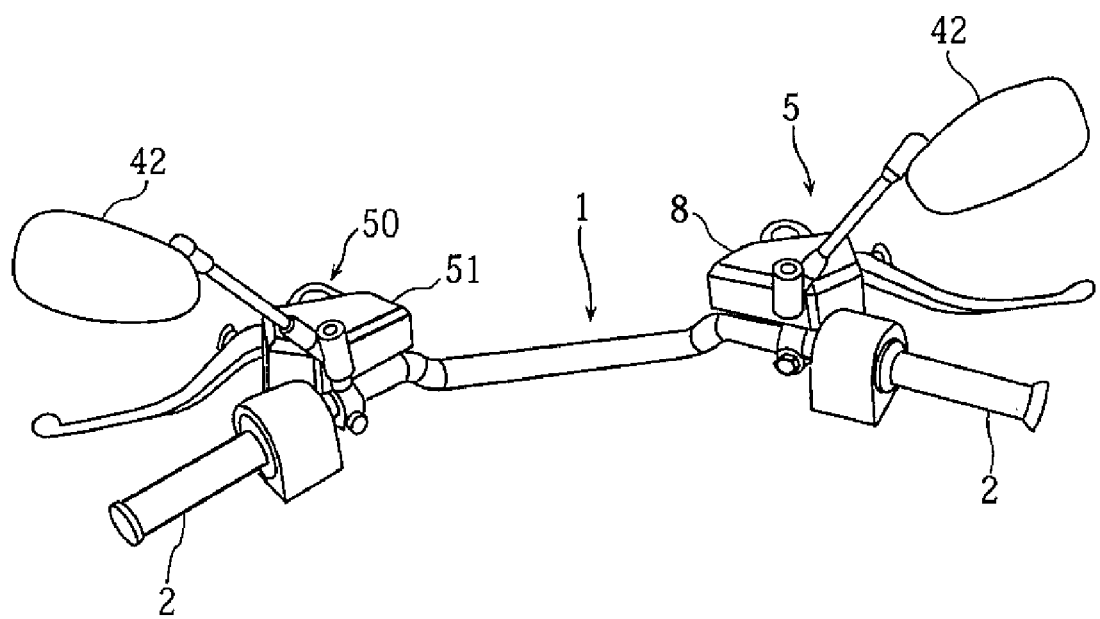

HYDRAULIC PRESSURE FEEDER AND MOTORCYCLE PROVIDED WITH THE HYDRAULIC PRESSURE FEEDER

RELATED APPLICATIONS

This application claims the benefit of priority under 35 USC 119 of Japanese patent application no. 2005-258321, filed on Sep. 6, 2005, which application is hereby incorporated by reference in its entirety.

BACKGROUND OF THE INVENTION

1. Field of the Invention

The present invention relates to a hydraulic pressure feeder arranged on a steering handle bar, and more particularly, to a hydraulic braking device or a hydraulic clutch device.

2. Description of Related Art

A conventional hydraulic braking device for a motorcycle comprises a master cylinder mounted to a handle bar, a reservoir tank that replenishes a piston mechanism received in the master cylinder with working oil, and a brake lever that drives the piston mechanism.

In one conventional hydraulic braking device, a master cylinder is fixed and perpendicular to a handle bar, and projects forward of the handle bar. A reservoir tank separate from the master cylinder is fixed to the handle bar and is connected to the master cylinder by a working oil pipe (see, for example, JP-A-10-250666).

Such a configuration is problematic in that vibrations transmitted to the handle bar from the road surface or engine may make the working oil wavy and cause generation of bubbles in the working oil.

SUMMARY OF THE INVENTION

The invention overcomes these drawbacks and provides a hydraulic pressure feeder that suppresses wavy motions and generation of bubbles in the working oil in a reservoir tank.

The invention provides a hydraulic pressure feeder comprising a handle bar, a master cylinder mounted to the handle bar to receive therein a piston mechanism, a reservoir tank that replenishes the piston mechanism with working oil, and a lever mechanism mounted to the master cylinder to drive the piston mechanism. The master cylinder is arranged forwardly of the handle bar and the reservoir tank is provided on the master cylinder to cover an upper portion of the master cylinder.

With the hydraulic pressure feeder according to the invention, since the reservoir tank is provided on the master cylinder to cover an upper portion of the master cylinder, it functions as a weight that absorbs vibrations transmitted to the handle bar and suppresses generation of wavy motions and bubbles in the working oil in the reservoir tank. That is, since the master cylinder is arranged forwardly of the handle bar and the reservoir tank is provided above the master cylinder, the reservoir tank is positioned separate from the handle bar. Therefore, the reservoir tank effectively functions as a weight that effectively absorbs vibrations and suppresses generation of wavy motions and bubbles.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a front part of a motorcycle, on which a hydraulic braking device according to an embodiment of the invention is mounted.

FIG. 2 is a rear perspective view of a handle bar, to which the hydraulic braking device is mounted.

FIG. 3 is a plan view of the hydraulic braking device.

FIG. 4 is a side view of the hydraulic braking device.

FIG. 5 is a cross sectional view of the hydraulic braking device taken along line V-V in FIG. 4.

FIG. 6 is a cross sectional view of the hydraulic braking device taken along line VI-VI in FIG. 5.

FIG. 7 is a cross sectional view of the hydraulic braking device taken along line VII-VII in FIG. 6.

FIG. 8 is a cross sectional view of a hydraulic braking device according to a modification of the embodiment.

FIG. 9 is a reference drawing illustrating a process, in which the invention is completed.

FIG. 10 is a perspective view of a further embodiment of the invention.

DETAILED DESCRIPTION OF THE INVENTION

Embodiments of the invention are described below with reference to the accompanying drawings.

FIGS. 1-7 illustrate a hydraulic pressure feeder according to an embodiment of the invention. The embodiment is described by way of a hydraulic braking device for motorcycles. In the following description, front and rear, and left and right mean front and rear, and left and right directions from the perspective of a driver grasping a steering handle.

In the drawings, reference numeral 1 denotes a handle bar for steering, and a central portion of the handle bar 1 in a vehicle width direction is fixed to an upper end of a front fork 30 through a handle bracket 31. The front fork 30 is journaled by a head pipe 33 fixed to a front end of a vehicle body frame 32, on which an engine 35 is mounted, to be steered left and right, and a front wheel 34 is journaled by a lower end of the front fork 30.

Grips 2a, 2b are mounted on left and right ends of the handle bar 1. Also, a switch box 3 including a starter switch, a kill switch, etc. is mounted inside the right grip 2b on the handle bar 1.

A hydraulic braking device 5 is arranged inside switch box 3. The hydraulic braking device 5 comprises a master cylinder 7 with a piston mechanism 6 therein, a reservoir tank 8 that replenishes piston mechanism 6 with working oil, and a brake lever (lever mechanism) 9 mounted to master cylinder 7 to drive piston mechanism 6.

A semi-circular recess 7' is concavely provided on a rear wall surface of the master cylinder 7 to surround a front half of the handle bar 1, and the master cylinder 7 is interposed by and fixed to the handle bar 1 by bolting and fixing a clamp member 36 to the recess 7' in a state in which the handle bar 1 is engaged by the recess 7'.

The master cylinder 7 comprises a cylinder body 7b including a cylinder hole 7a opened forward, a lever support portion 7c formed integrally to project forward from an inner portion of the cylinder body 7b, and a working oil discharge portion 7d formed integrally on a bottom of the cylinder body 7b.

The piston mechanism 6 comprises a piston body 10 inserted slidably into the cylinder hole 7a of the cylinder body 7b, and a spring 11 arranged between the piston body 10 and a bottom wall of the cylinder hole 7a to bias the piston body 10 in an anti-braking direction.

The piston body 10 comprises a pair of forward and rearward slide portions 10a, 10b in sliding contact with an inner peripheral surface of the cylinder hole 7a, and a push portion 10c projecting forward from an opening of the master cylinder 7. A boot 13 is mounted between the push portion 10c and the cylinder hole 7a of the cylinder body 7b to prevent invasion of foreign matter.

Sealing members 12, 12 are mounted to the forward and rearward slide portions 10a, 10b of the piston body 10 to provide sealing between the same and the cylinder hole 7a. A hydraulic pressure chamber 'a' is defined by the forward slide portion 10a and a bottom portion of the cylinder hole 7a.

The brake lever 9 comprises a base 9a pivotally supported on the lever support portion 7c of the master cylinder 7 by a support shaft 15, and a hold portion 9b contiguous to the base 9a to extend outward along the grip 2. A direction (turning direction) 'b', in which the brake lever 9 is grasped, agrees with a direction c, in which the piston body 10 is moved (see FIG. 3).

An engagement recess 9c is formed close to and outside the base 9a of the brake lever 9, and the push portion 10c of the piston body 10 engages with the engagement recess 9c. An adjustment bolt 17 is threadedly inserted into the brake lever 9 to abut against the push portion 10c, and an initial position of the brake lever 9 can be adjusted by advancing and retreating the adjustment bolt 17.

A discharge passage 7e formed on discharge portion 7d of master cylinder 7 communicates with hydraulic pressure chamber 'a'. The discharge passage 7e faces an upper edge of the cylinder hole 7a and also functions as an air vent hole. Thereby, a bleed screw for air vent is dispensed with.

A union bolt 18 is threadedly mounted to the discharge portion 7d and a communication passage 18a communicated to the discharge passage 7e is formed in the union bolt 18. A brake hose (hydraulic pressure feed hose) 19 is connected to the communication passage 18a of the union bolt 18 and a brake caliper 38 arranged on front wheel 34. The brake caliper 38 interposes a disk plate 39 fixed to the front wheel 34 and is fixed to the lower end of front fork 30 by a bracket 40.

The reservoir tank 8 is formed integral with the master cylinder 7 to be forwardly separate from the steering handle bar 1 and to cover upper portions of the cylinder body 7b and the discharge portion 7d. The master cylinder 7 and the reservoir tank 8 comprise castings of aluminum alloy.

The reservoir tank 8 comprises a tank casing 8a contiguous to the master cylinder 7 to extend upward in a substantially bowl-shaped manner, a lid member 20 that closes an upper end opening of the tank casing 8a, and a resin-made vessel 21 arranged in the tank casing 8a with a predetermined clearance between it and the tank casing 8a and filled with working oil.

A diaphragm 25 supported on a plate 24 is arranged in an opening of the tank casing 8a. The plate 24 together with the lid member 20 is clamped and fixed to the tank casing 8a.

A cylindrical-shaped connection port 21a is formed on a bottom of the vessel 21 and is inserted into a bearing recess 8b formed on a bottom of the tank casing 8a, with a sealing member 22 therebetween.

A supply port 8c communicated to the hydraulic pressure chamber a of the master cylinder 7 is formed in the bearing recess 8b of the tank casing 8a. The supply port 8c is communicated to the hydraulic pressure chamber 'a' in a state of non-braking operation and closed when the piston body 10 is pushed upon the braking operation of the brake lever 9 and moved, so that when the piston body 10 is further moved, hydraulic pressure is generated in the hydraulic pressure chamber 'a'.

Elastic members 26 are interposed between an inner peripheral surface of the tank casing 8a and an outer peripheral surface of the vessel 21 and between the connection port 21a of the vessel 21 and the bearing recess 8b. The elastic members 26 are made of rubber, sponge, etc. whereby the vessel 21 is supported in a state of rising from the tank casing 8a with the elastic members 26 therebetween.

A back mirror mount boss 7g is formed integrally on an opposite side of the master cylinder 7 to the handle bar 1 with the reservoir tank 8 therebetween to project forward. The mount boss 7g is positioned between the cylinder body 7b and the discharge portion 7d to project forward from the master cylinder 7, and a lower end of a back mirror 42 is mounted to a boss hole 7h of the mount boss 7g.

Master cylinder 7 is positioned forwardly of a vehicle relative to handle bar 1 and arranged in a direction in which an axis A of the piston body 10 intersects a grip center line B of handle bar 1. More specifically, master cylinder 7 is inclined at about 25 degrees outside a vehicle to a vertical line which passes through the grip center line B of the handle bar 1.

An axis C of discharge passage 7e of discharge portion 7d obliquely intersects grip center line B of handle bar 1 and extends forward. More specifically, discharge portion 7d is inclined forward at about 25 degrees to grip center line B of handle bar 1 and forms a right angle to axis A of piston body 10. Thereby, a clearance 's' is formed between the discharge portion 7d and the handle bar 1 to permit insertion of a tool for clamping of union bolt 18.

When the brake lever 9 is pulled this side with right grip 2b grasped, piston body 10 is pushed and moved to close supply port 8c to generate a hydraulic pressure in hydraulic pressure chamber 'a'. The hydraulic pressure is transmitted through the brake hose 19 to the brake caliper 38 from the discharge passage 7e, and the disk plate 39 is interposed by the brake caliper 38 to brake the front wheel 34.

Since reservoir tank 8 is formed integrally on the master cylinder 7 to cover an upper portion of the same and is positioned forwardly of the handle bar 1, reservoir tank 8 is positioned forward and upwardly away from handle bar 1 to effectively function as a weight that absorbs vibrations transmitted to the handle bar 1, thereby suppressing generation of wavy motions and bubbles in a working oil in reservoir tank 8.

That is, the embodiment premises a radial pump type, in which the master cylinder 7 is extended forward to intersect the handle bar 1. Since the reservoir tank 8 extending upward is formed integrally on the master cylinder 7 of such radial pump type, the reservoir tank 8 is positioned upward and forwardly away from the handle bar 1. Therefore, the reservoir tank 8 effectively functions as a weight that absorbs vibrations.

According to the embodiment, since the master cylinder 7 is inclined outside at around 25 degrees to a vertical line that passes through the grip center line B of the handle bar 1, to have a direction 'b', in which the brake lever 9 is grasped, agreeing substantially with a direction 'c', in which the piston body 10 is moved, a manipulating force on brake lever 9 is effectively transmitted to piston mechanism 6, so that it is possible to increase a braking force in large-sized vehicles.

Since axis C of the discharge passage 7e of the discharge portion 7d obliquely intersects the center line 13 of the handle bar 1 and extends forward, a clearance 's' for clamping union bolt 18 is formed between the discharge portion 7d and the handle bar 1 to facilitate the connecting work of the brake hose 19.

That is, where discharge passage 7e is parallel to handle bar 1 as shown in FIG. 9, a clearance s1 cannot be sufficiently ensured between the discharge portion 7d and the handle bar 1. In this case, for example, when the discharge portion 7d is arranged on an axially central portion of the master cylinder 7 to enlarge the clearance, there is a problem in that the master cylinder 7 is increased in axial dimension correspondingly to interfere with, for example, a window screen, and a distance between the grip and the brake lever becomes large to impair operability.

Also, since the discharge passage 7e is arranged so that the axis C obliquely intersects the handle bar 1, it is possible to arrange the discharge passage 7e on an upper edge of the cylinder hole 7a without interference with the handle bar 1, thus enabling dispensing with a bleed screw for air vent.

Since reservoir tank 8 comprises the tank casing 8a formed integral with the master cylinder 7 and the resin-made vessel 21 arranged in the tank casing 8a with a clearance between it and the tank casing 8a, vibrations are not transmitted to vessel 21, further suppressing wavy motions of the working oil.

Furthermore, since elastic member 26 is interposed between the inner peripheral surface of tank casing 8a and the outer peripheral surface of vessel 21, the elastic member 26 absorbs vibrations transmitted to the vessel 21 from the tank casing 8a, thus further suppressing wavy motions of the working oil.

Since mount boss 7g for back mirror 42 is formed on an opposite side of master cylinder 7 to handle bar 1 with reservoir tank 8 therebetween, back mirror 42 mounted to mount boss 7g to be upright therefrom functions as a weight that absorbs vibrations, further suppressing wavy motions of the working oil.

In this case, since back mirror mount boss 7g projects forward from master cylinder 7, back mirror 42 is positioned forwardly away from master cylinder 7, thus further suppressing wavy motions of the working oil.

In addition, while master cylinder 7 has been described as inclined outside at about 25 degrees to a vertical line which passes through grip center line B of handle bar 1, master cylinder 7 may alternatively be arranged forward to be perpendicular to handle bar 1 and discharge portion 7d may intersect handle bar 1 obliquely as shown in FIG. 8. In this case, a tool T for clamping of the union bolt 18 can be inserted, to produce the same effect as in the previous embodiment.

While the embodiment has been described by way of a hydraulic braking device for motorcycles, the invention is also applicable to hydraulic clutch devices.

As shown in FIG. 2, a hydraulic clutch device 50 comprises a master cylinder mounted inside the right grip 2a on the handle bar 1 to accommodate therein a piston mechanism, a reservoir tank 51 that replenishes the piston mechanism with working oil, and a clutch lever 52 mounted to the master cylinder to drive the piston mechanism. The reservoir tank 51 is formed integral with the master cylinder to be forwardly away from the handle bar 1 and to cover an upper portion of the master cylinder, and has substantially the same detailed structure as that of the hydraulic braking device 5.

With the hydraulic clutch device 50, when the clutch lever 52 is pulled this side with the left grip 2a grasped, a hydraulic pressure is generated and transmitted to a clutch mechanism (not shown), so that a clutch is made ON or OFF with a light manipulating force. Since reservoir tank 51 is positioned forwardly and upwardly away from handle bar 1, it effectively functions as a weight that absorbs vibrations transmitted to handle bar 1, thereby producing substantially the same effect as in the previous embodiment.

In addition to motorcycles, the hydraulic braking and clutch devices of the invention are applicable to other vehicles such as small-sized three-wheelers, four-wheelers, ATVs (all-terrain vehicles), etc.

While mount boss 7g for back mirror 42 is formed on master cylinder 7, left and right back mirrors may be mounted directly inside left and right grips 2, 2 of handle bar 1 separately from the master cylinder as shown in FIG. 10.

The particular embodiments of the invention described in this document should be considered illustrative, rather than restrictive. Modification to the described embodiments may be made without departing from the spirit of the invention as defined by the following claims.

The invention claimed is:

1. A hydraulic pressure feeder comprising:
   a handle bar;
   a master cylinder mounted to the handle bar to receive therein a piston mechanism, the piston mechanism including a piston body;
   a reservoir tank that replenishes the piston mechanism with working oil; and
   a lever mechanism mounted to the master cylinder to drive the piston mechanism, wherein
   the master cylinder is arranged forwardly of the handle bar and the reservoir tank is provided on the master cylinder to cover an upper portion of the master cylinder,
   the master cylinder is arranged in a direction in which an axis of the piston body intersects an axis of the handle bar, and
   a discharge passage, through which working oil pressurized by the piston mechanism passes, is formed in the master cylinder so that an axis thereof intersects the axis of the handle bar and extends forward, and a hydraulic pressure feed hose is connected to a downstream end of the discharge passage.

2. The hydraulic pressure feeder according to claim 1, wherein the discharge passage is formed on an upper edge of a cylinder hole of the master cylinder.

3. The hydraulic pressure feeder according to claim 1, wherein the reservoir tank is formed integral with the master cylinder.

4. The hydraulic pressure feeder according to claim 1,
   wherein the lever mechanism is pivotally supported on the master cylinder through a support shaft, and
   wherein a direction in which the lever mechanism turns agrees substantially with a direction in which the piston body of the piston mechanism is moved.

5. A motorcycle comprising the hydraulic pressure feeder of claim 1.

6. The motorcycle according to claim 5, wherein the hydraulic pressure feeder is a hydraulic braking device.

7. The motorcycle according to claim 5, wherein the hydraulic pressure feeder is a hydraulic clutch device.

8. A hydraulic pressure feeder comprising:
   a handle bar;
   a master cylinder mounted to the handle bar to receive therein a piston mechanism, the piston mechanism including a piston body;
   a reservoir tank that replenishes the piston mechanism with working oil; and
   a lever mechanism mounted to the master cylinder to drive the piston mechanism, wherein
   the master cylinder is arranged forwardly of the handle bar and the reservoir tank is provided on the master cylinder to cover an upper portion of the master cylinder, the master cylinder is arranged in a direction in which an axis of the piston body intersects an axis of the handle bar, and the reservoir tank comprises a tank casing formed integral with the master cylinder and a vessel arranged in the tank casing with a clearance between it and the tank casing to accommodate therein the working oil.

9. The hydraulic pressure feeder according to claim 8, wherein an elastic member is interposed between the tank casing and the vessel.

10. A hydraulic pressure feeder comprising:

a handle bar;

a master cylinder mounted to the handle bar to receive therein a piston mechanism, the piston mechanism including a piston body;

a reservoir tank that replenishes the piston mechanism with working oil; and a lever mechanism mounted to the master cylinder to drive the piston mechanism, wherein the master cylinder is arranged forwardly of the handle bar and the reservoir tank is provided on the master cylinder to cover an upper portion of the master cylinder, the master cylinder is arranged in a direction in which an axis of the piston body intersects an axis of the handle bar, and a back mirror mount boss is formed on an opposite side of the master cylinder to the handle bar with the reservoir tank therebetween.

* * * * *